(12) United States Patent
Bui et al.

(10) Patent No.: US 8,159,770 B2
(45) Date of Patent: Apr. 17, 2012

(54) APPARATUS AND METHOD TO TRANSFER DATA TO AND FROM A SEQUENTIAL INFORMATION STORAGE MEDIUM

(75) Inventors: Nhan Xuan Bui, Tucson, AZ (US); Reed Alan Hancock, Tucson, AZ (US); Robert Allen Hutchins, Tucson, AZ (US); Larry Leeroy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/353,106

(22) Filed: Jan. 13, 2009

(65) Prior Publication Data

US 2010/0177436 A1  Jul. 15, 2010

(51) Int. Cl.
*G11B 15/12* (2006.01)
(52) U.S. Cl. ............................................. 360/63
(58) Field of Classification Search .................. None
See application file for complete search history.

(56) References Cited

U.S. PATENT DOCUMENTS

| | | | |
|---|---|---|---|
| 3,903,545 A | 9/1975 | Beecroft | |
| 6,025,970 A | 2/2000 | Cheung | |
| 6,349,010 B1* | 2/2002 | Binder-Krieglstein | 360/63 |
| 6,992,857 B2* | 1/2006 | Knowles et al. | 360/77.12 |
| 7,505,221 B2* | 3/2009 | Watson | 360/121 |
| 7,529,060 B2* | 5/2009 | Simmons et al. | 360/77.12 |
| 7,570,450 B2* | 8/2009 | Koeppe | 360/75 |
| 7,724,465 B2* | 5/2010 | Koeppe | 360/75 |
| 7,852,599 B2* | 12/2010 | Bui et al. | 360/77.12 |
| 2003/0189782 A1 | 10/2003 | Leonhardt et al. | |
| 2005/0259358 A1* | 11/2005 | Ozue | 360/129 |
| 2007/0097541 A1 | 5/2007 | Okafuji et al. | |

OTHER PUBLICATIONS

"Read-Compatible N- and 2N-Track Tape Recording Formats," Jun. 1994, IBM TDB vol. 37, No. 6B, pp. 329-330.*
IBM TDB, "Data-Servo Head Configuration Allowing Four Tracks to be Read at a Time," Mar. 1997-2008.

* cited by examiner

*Primary Examiner* — Hoa T Nguyen
*Assistant Examiner* — James L Habermehl
(74) *Attorney, Agent, or Firm* — Dale F. Regelman; Quarles & Brady LLP

(57) ABSTRACT

A sequential information storage medium, comprising a plurality of servo patterns encoded lengthwise thereon, wherein each servo pattern encodes at least one LPOS bit and comprises a width less than 187 microns.

20 Claims, 12 Drawing Sheets

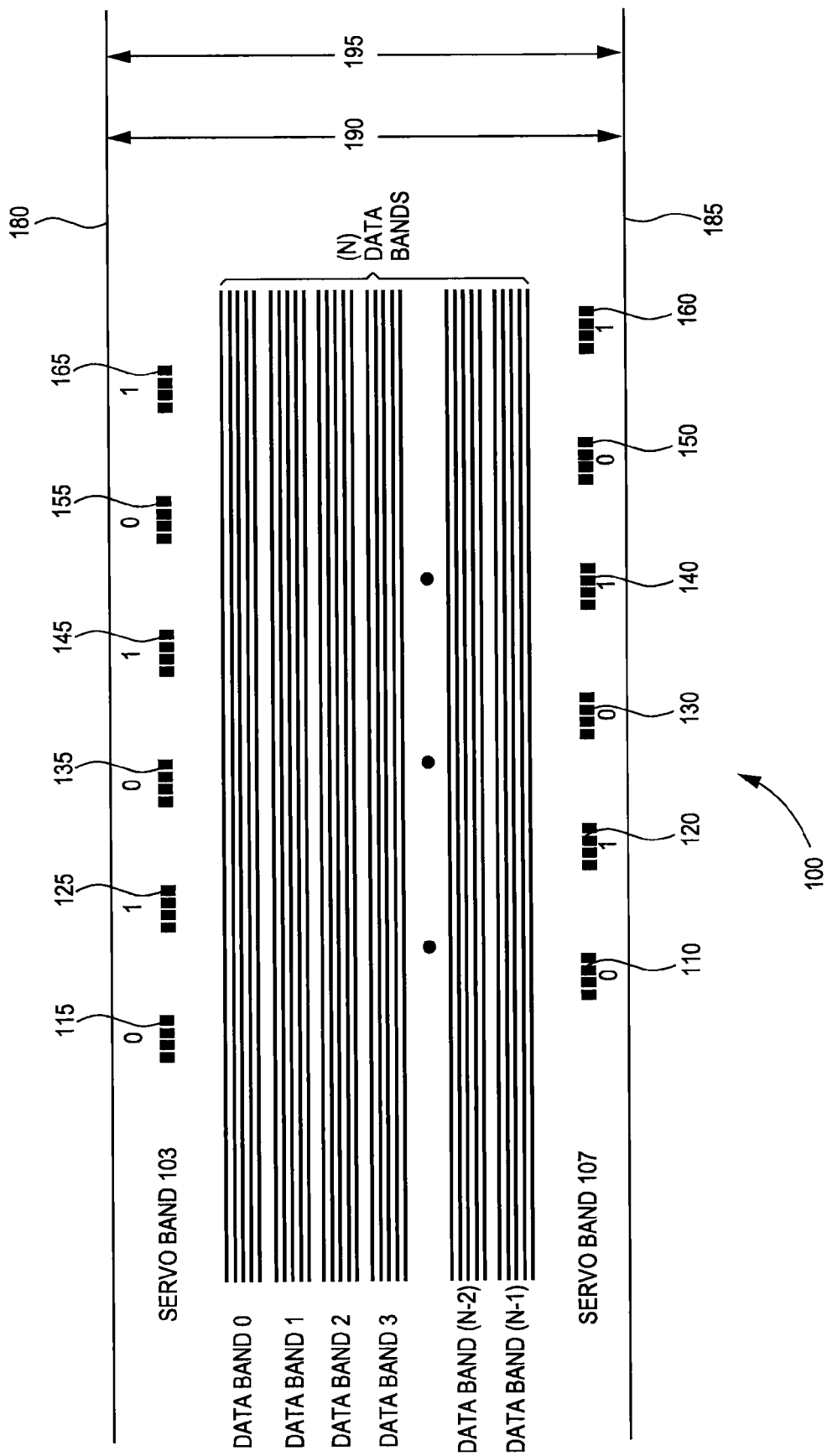

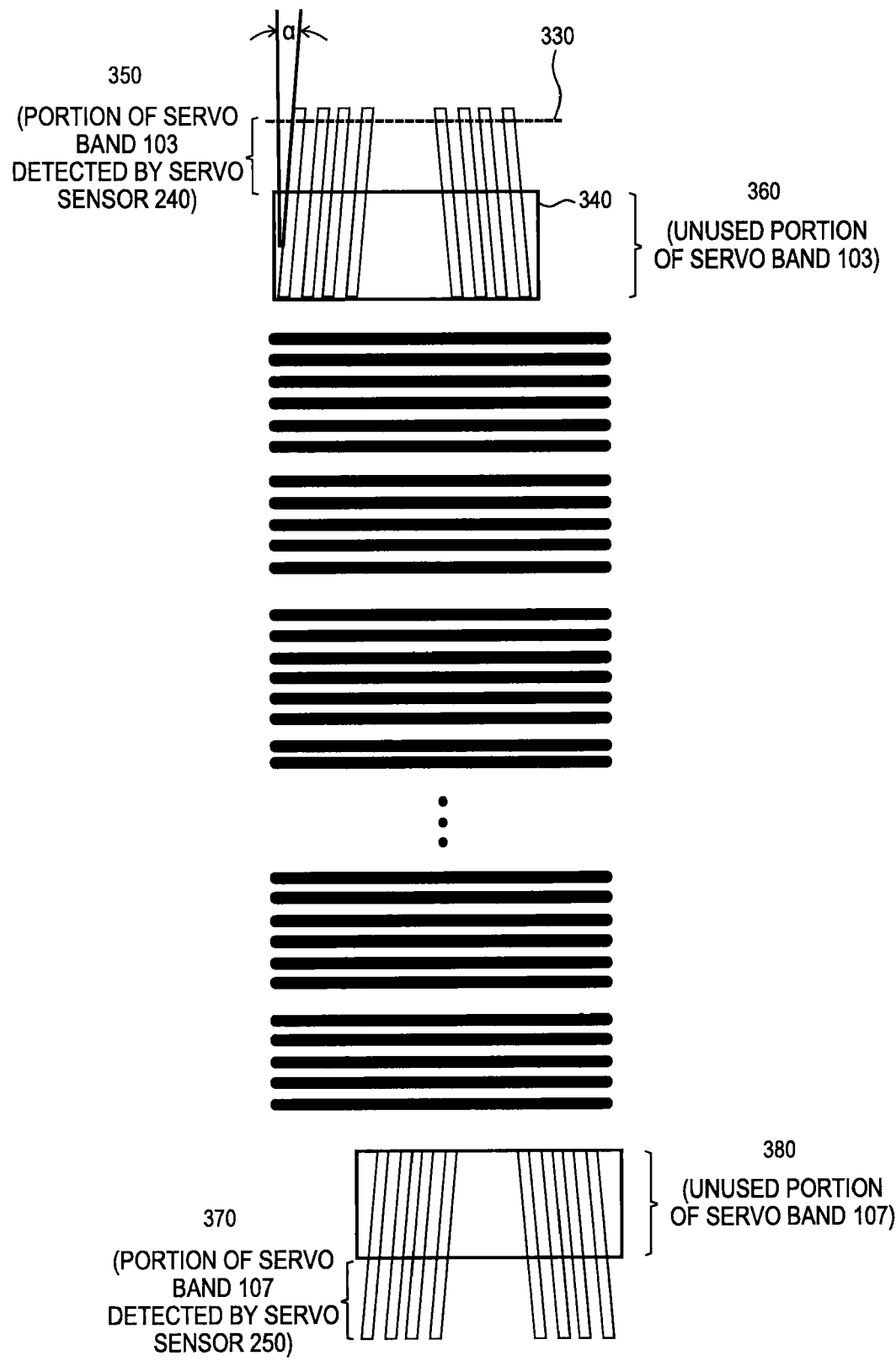

APPARATUS AND METHOD TO TRANSFER DATA TO AND FROM A SEQUENTIAL INFORMATION STORAGE MEDIUM

FIELD OF THE INVENTION

The invention relates to a method to increase the number of data bands written to a sequential information storage medium. In certain embodiments, the invention further relates to enhanced accuracy with respect to the linear positioning of a read/write head along the length of a sequential information storage medium. In certain embodiments, the invention further relates to enhanced accuracy with respect to the longitudinal positioning of a read/write head across the width of a sequential information storage medium.

BACKGROUND OF THE INVENTION

Sequential information storage media typically comprise two servo bands in combination with a plurality of data bands disposed between those two servo bands. Each data band comprises a plurality of data tracks. Each servo band comprises a plurality of servo patterns.

It is known in the art to encode in a non-data region of a sequential information storage medium, such as a magnetic tape, linear positioning ("LPOS") information using a plurality of sequential servo patterns, wherein each servo pattern encodes as least one LPOS bit. Each LPOS word relates to a specific absolute longitudinal address, and appears every 7.2 mm down the tape. Using prior art methods, an LPOS word comprises 36 individual servo patterns, i.e. frames, wherein each frame encodes one bit of information. The LPOS values of two consecutive LPOS words differ by one. Therefore, a tape drive can position a data/servo head assembly at a specified LPOS address thereby achieving a longitudinal resolution of about 7.2 mm.

SUMMARY OF THE INVENTION

Prior art sequential storage media comprises a storage medium width, a plurality of first servo patterns comprising a first servo pattern width and encoded lengthwise therein, and (N) data bands encoded lengthwise therein. Applicant's sequential storage medium comprises the storage medium width, a plurality of second servo patterns each comprising a second servo pattern width and encoded lengthwise therein, and (2N+1) data bands encoded lengthwise therein.

Applicant's data storage apparatus can simultaneously read data from, or simultaneously write data to, (N) data tracks disposed in a sequential data storage medium. In addition, Applicant's data storage apparatus can simultaneously read data from, or simultaneously write data to, (2N+1) data tracks disposed in a sequential data storage medium.

Applicant's invention further comprises a method to encode a plurality of LPOS words in a sequential information storage medium, wherein each LPOS word comprises a plurality of servo patterns comprising the second servo pattern width. In certain embodiments, a sequential information storage medium encoded with LPOS words comprising Applicant's servo patterns comprising the second servo pattern width facilitates enhanced accuracy with respect to the linear positioning of a read/write head along the length of a sequential information storage medium. In certain embodiments, a sequential information storage medium encoded with LPOS words comprising Applicant's servo patterns comprising the second servo pattern width facilitates enhanced accuracy with respect to the longitudinal positioning of a read/write head across the width of a sequential information storage medium.

BRIEF DESCRIPTION OF THE DRAWINGS

The invention will be better understood from a reading of the following detailed description taken in conjunction with the drawings in which like reference designators are used to designate like elements, and in which:

FIG. 1A illustrates a prior art sequential information storage medium comprising two servo bands and (N) data bands encoded between the two servo bands;

FIG. 4D illustrates certain unused portions of the prior art servo bands shown in FIGS. 4B and 4C;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1B:
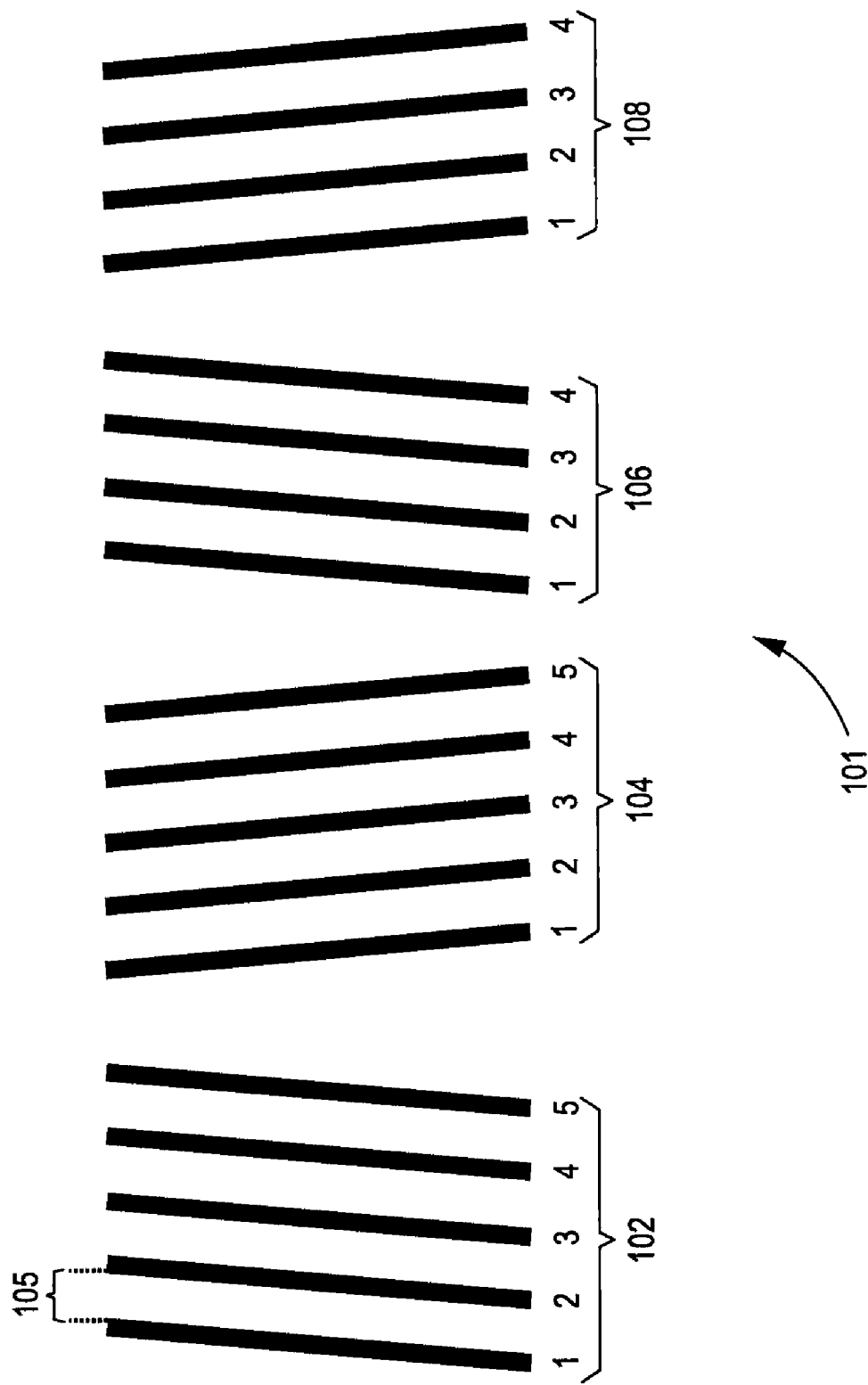
FIG. 1B illustrates a prior art "5 5 4 4" servo pattern.

Referring now to FIGS. 1A and 1B, sequential information storage medium 100 comprises a first side 180, an opposing second side 185, a traverse axis 190 orthogonal to sides 180 and 185, a storage medium width 195, and a plurality of servo patterns 110, 115, 120, 125, 130, 135, 140, 145, 150, 155, 160, and 165, encoded in non-data portions of the sequential information storage medium. Those servo patterns are used to position a read/write head, such as read/write head 210 (FIGS. 2A, 2B) with respect to a plurality of data band, to provide sync data, to provide manufacturer data, and to determine linear position ("LPOS") along the length of the medium.

Read/write head lateral position across the width of sequential information storage medium 100 is derived from the relative timings of pulses generated by servo sensors detecting the servo bands 103 and 107. These servo sensors generate transversal position error signals ("PES"). Servo bands 103 and 107 also encode LPOS information without affecting the generation of the transversal position error signal ("PES"). LPOS information is encoded by shifting transitions, i.e. pulses, from the nominal pattern positions shown in FIG. 1B. In illustrated embodiment of FIG. 1A, two servo bands, such as for example Servo Band 103 and Servo Band 107, encode LPOS information, and are detected by servo sensors which generate PES signals.

Referring to FIG. 1B, servo pattern 101 comprises a first burst 102 comprising five pulses, wherein each of those five pulses comprises a first azimuthal slope and wherein each of the five pulses in burst 102 is separated from neighboring pulses by a nominal spacing 105. Servo pattern 101 further comprises a second burst 104 comprising five pulses, wherein each of those five pulses comprises a second azimuthal slope, and wherein each of the five pulses in burst 104 is separated from neighboring pulses by a nominal spacing 105.

Servo pattern 101 further comprises a third burst 106 comprising four pulses, wherein each of those four pulses comprises the first azimuthal slope, and wherein each of the four pulses in burst 106 is separated from neighboring pulses by a nominal spacing 105. Servo pattern 101 further comprises a fourth burst 108 comprising four pulses, wherein each of those four pulses comprises the second azimuthal slope, and wherein each of the four pulses in burst 108 is separated from neighboring pulses by a nominal spacing 105.

Because all of the pulses disposed in servo pattern 101 are separated from neighboring pulses by the same nominal spacing 105, servo pattern 101 does not encode any LPOS information. The spacings between pulses in burst 102 and in burst 104 can be adjusted to encode LPOS data.

Figure 2A:
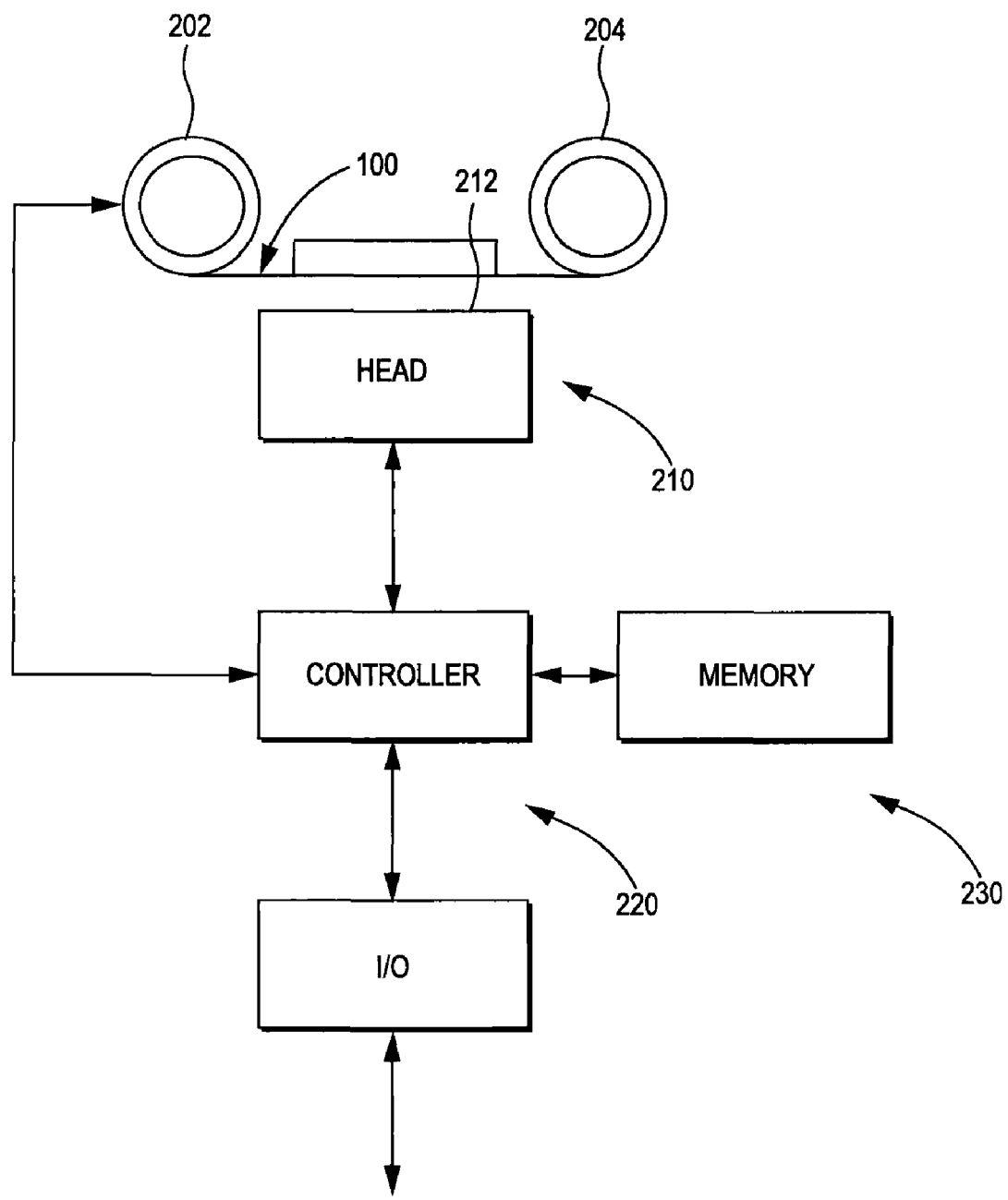
FIG. 2A is a block diagram showing components used to read information from, and/or write information to, the sequential information storage medium of FIG. 1A.

Referring now to FIG. 2A, when reading data from, and/or writing data to, sequential information storage medium 100, a portion of the storage medium is disposed on a first rotatable reel, such as reel 202, and a portion of the tape medium is disposed on a second rotatable reel, such as reel 204. The rotatable reels are moved such that tape storage medium 100 is moved from one reel, past read/write head 210, and onto to the other reel. In the illustrated embodiment of FIG. 2A, read/write head 210 is in communication with controller 220. In certain embodiments, controller 220 is integral with read/write head 210. Controller 220 is in communication with computer readable memory 230.

In certain embodiments, computer readable memory 230 is integral with controller 220. In the illustrated embodiment of FIG. 2A, reel 202, reel 204, read/write head 210, controller 220, and computer readable memory 230 are disposed within a tape drive apparatus. As those skilled in the art will appreciate, such tape drive apparatus may comprise other elements and components not shown in FIG. 2A.

Figure 2B:
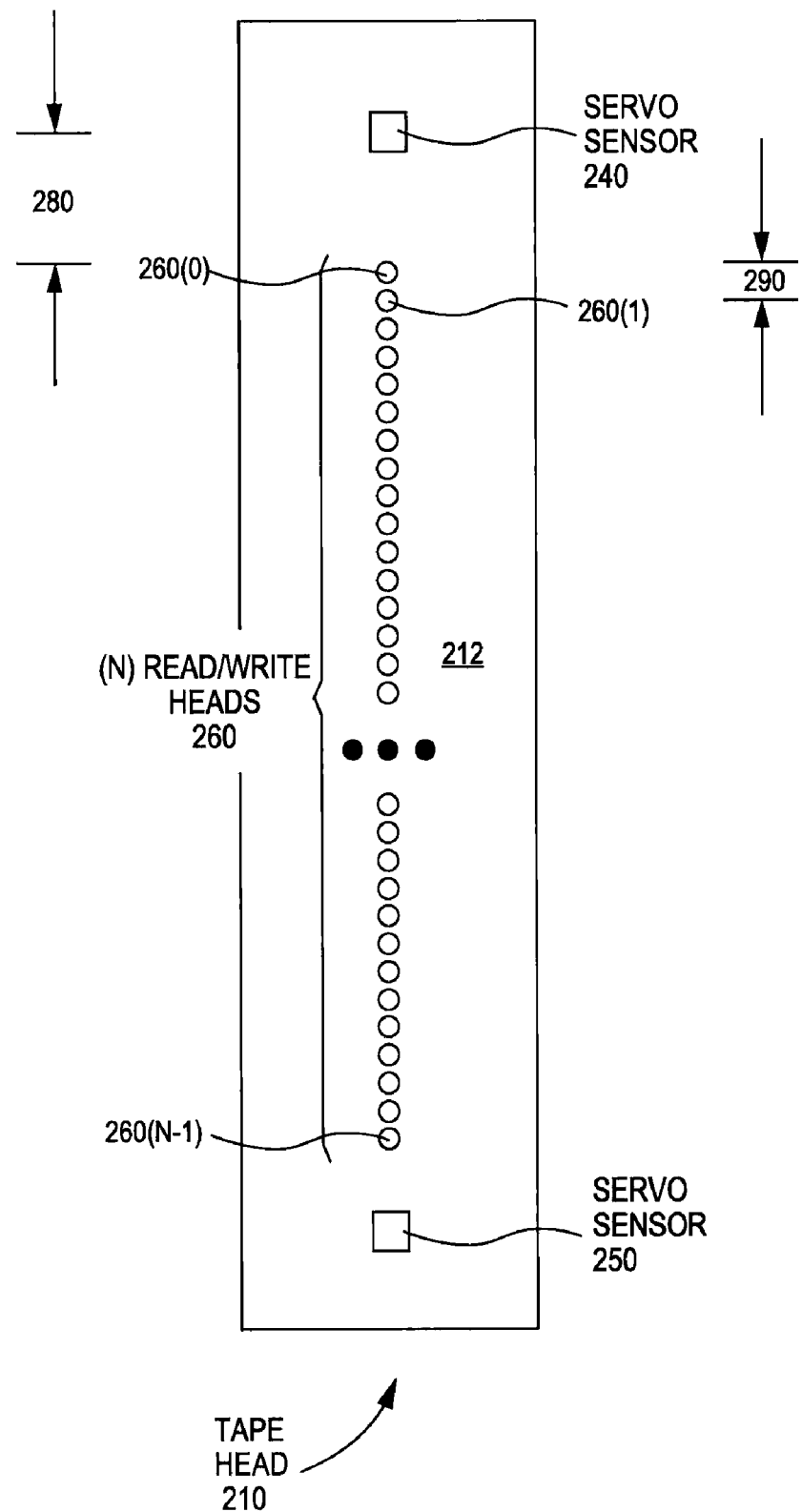
FIG. 2B illustrates a read/write head used to read information from, and/or write information to, the sequential information storage medium of FIG. 1A.

FIG. 2B illustrates read/write head surface 212 (FIGS. 2A and 2B), wherein surface 212 has a facing relationship with tape 100 as tape 100 is moved from first reel 202 to second reel 204. In the illustrated embodiment of FIG. 2B, read/write head 210 comprises (N) read/write heads, servo sensor 240, and servo sensor 250.

In prior art read/write heads, (N) is typically 8, or 16, or 32. As those skilled in the art will appreciate, read/write head 210 may comprise additional elements not shown in FIG. 2A or 2B.

In the illustrated embodiment of FIG. 2B, read/write head 210 comprises servo sensor 240 disposed adjacent one end of surface 212, and servo sensor 250 disposed adjacent a second and opposing end 250 of surface 212. A total of (N) read/write heads are disposed on surface 212 between servo sensor 240 and servo sensor 250. A distance 280 separates servo sensor 240 and read/write head 260(0), and servo sensor 250 and a (N−1)th read/write head. Further in the illustrated embodiment of FIG. 2B, a distance 290 separates each read/write head from the one or two adjacent read/write heads, for each read/write head 260(0) and 260(1).

Referring now to FIGS. 2A, 2B, and 3A, as tape 100 is moved adjacent read/write head 210, a read/write head lateral position is derived from the relative timings of pulses generated by servo sensor 240 detecting the plurality of servo patterns comprising servo band 103, and from the relative timings of pulses generated by servo sensor 250 detecting the plurality of servo patterns comprising servo band 107. In addition, an (i)th read/write head reads signals encoded in a selected data track disposed in an (i)th Data Band.

Figure 3:
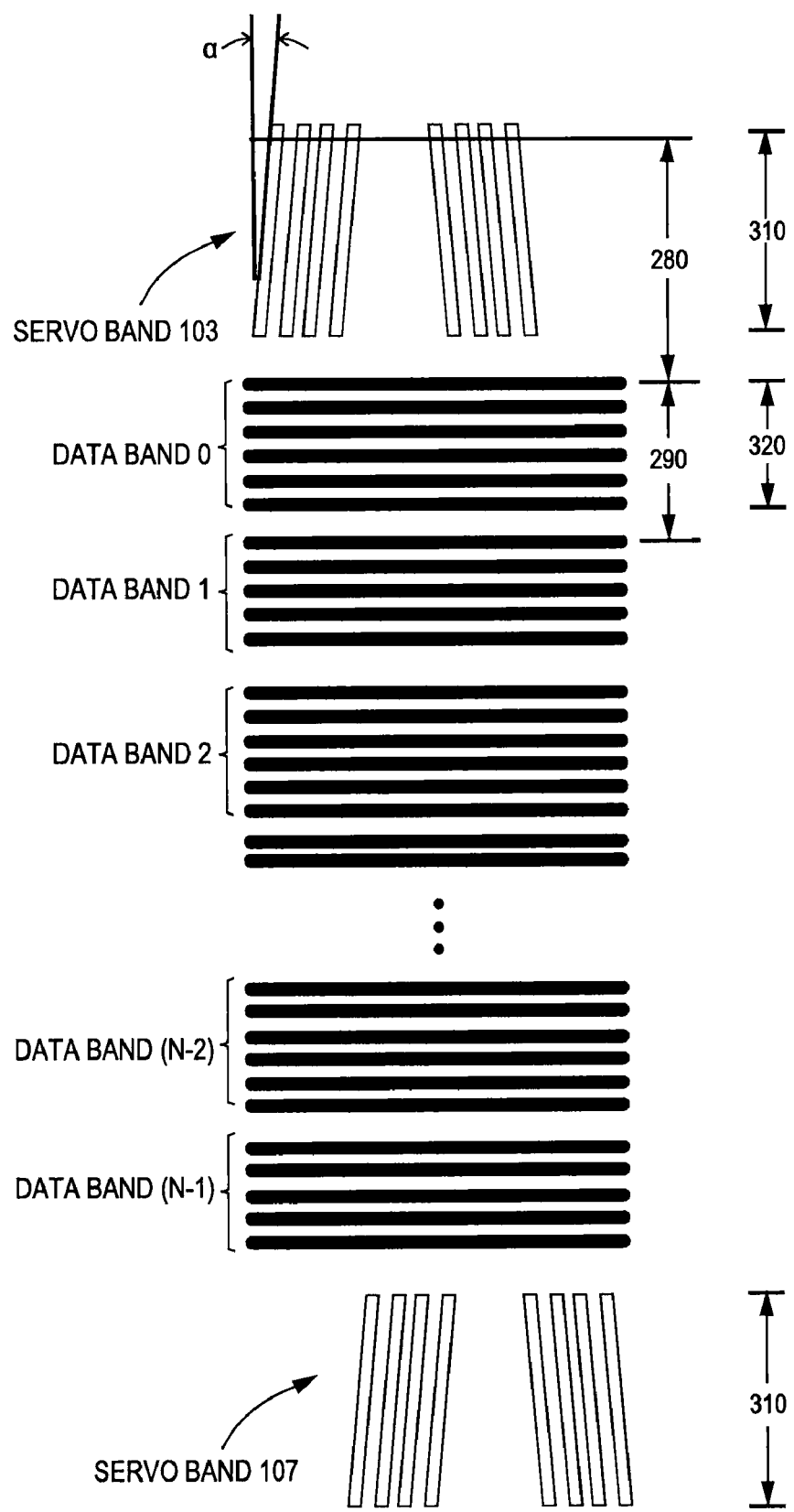
FIG. 3 illustrates a prior art servo pattern/data band architecture.
Figure 4A:
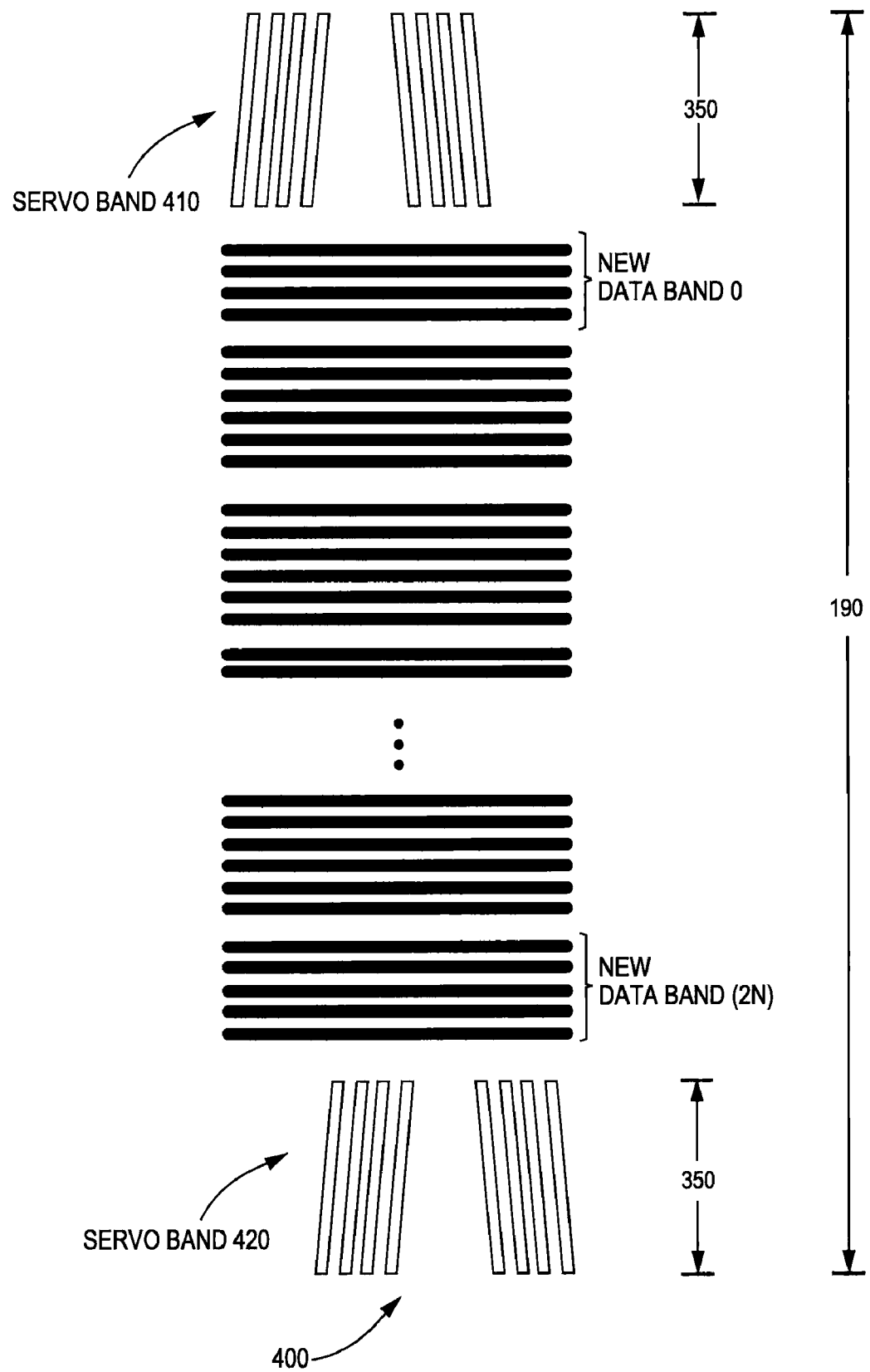
FIG. 4A illustrates Applicant's sequential information storage medium comprising a plurality of servo patterns each comprising a reduced servo pattern width and (2N+1) data bands.

Referring now to FIG. 3, the legacy sequential data storage medium 100 comprises (N) data bands each comprising a width 320, and one or more servo bands comprising a width 310. Referring now to FIG. 4A, Applicant's sequential data storage medium 400 comprises (2N+1) data bands each comprising a width 320 divided by 2, and one or more servo bands comprising a width 350, where width 350 is substantially equal to width 320 divided by two. By "substantially equal to," Applicant means equal to or up to ten percent (10%) greater than.

By more than doubling the number of data bands read at a time, the rate that data is read from Applicant's sequential storage medium 400 is increased by more than a factor of two. Every other track in Applicant's sequential storage medium 400 overlays a track written to prior art sequential storage medium 101.

As a general matter, Applicant's sequential storage medium comprises (X) times (N) data bands, wherein each servo band comprises a width equal to [width 290/(X)], and wherein that sequential storage medium comprises [(X)(N)+ (X−1)] data tracks. Where the prior art sequential storage medium comprises 16 data bands, one embodiment of Applicant's sequential data storage medium comprises 33 tracks (X=2). Another embodiment of Applicant's sequential data storage medium comprises 67 tracks (X=4).

Figure 4B:
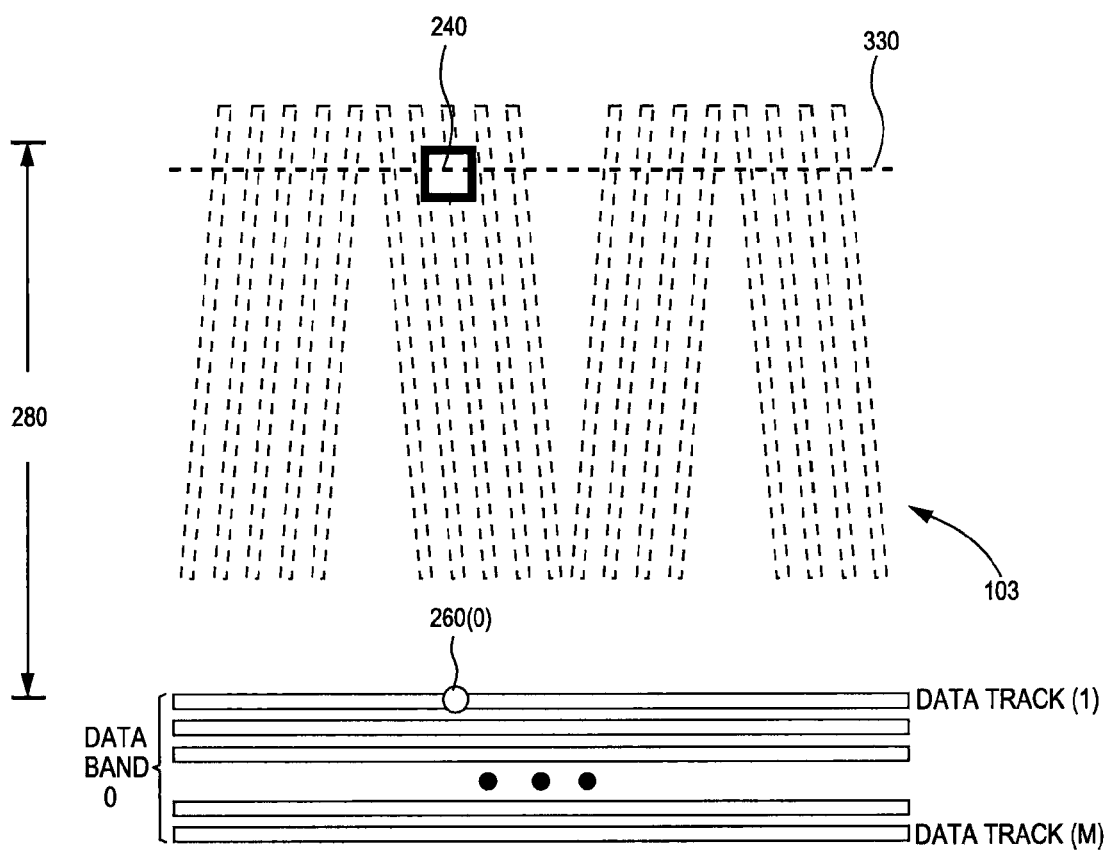
FIG. 4B illustrates the positioning a servo sensor with respect to a prior art servo pattern if reading information from, and/or writing information to, data tracks encoded in a first edge of one of Applicant's data bands.

Applicant's sequential storage medium 400 comprises (2N+1) data bands, wherein a first track of each data band is separated from a first track of an adjacent data band by a distance equal to [(distance 290/(2)]. Referring now to FIG. 4B, Data Band 0 of Applicant's sequential storage medium 400 comprises a total of (M) data tracks. When a read head 260(0) is reading data encoded in a first data track disposed in Data Band 0, servo sensor 240 would detect a portion of prior art servo band 103 adjacent servo sensor position 330. More generally, when read/write head 210 is laterally positioned such that an (i)th read/write head reads data encoded in a first data track encoded in an (i)th Data Band, servo sensor 240 would detect a portion of prior art servo band 103 adjacent servo sensor position 330. Similarly, at the same time, servo sensor 250 would detect a portion of prior art servo band 107 adjacent servo sensor position 330. As those skilled in the art will appreciate, both servo bands are read simultaneously. In the event one servo channel has errors, the servo system switches to the other servo channel.

Figure 4C:
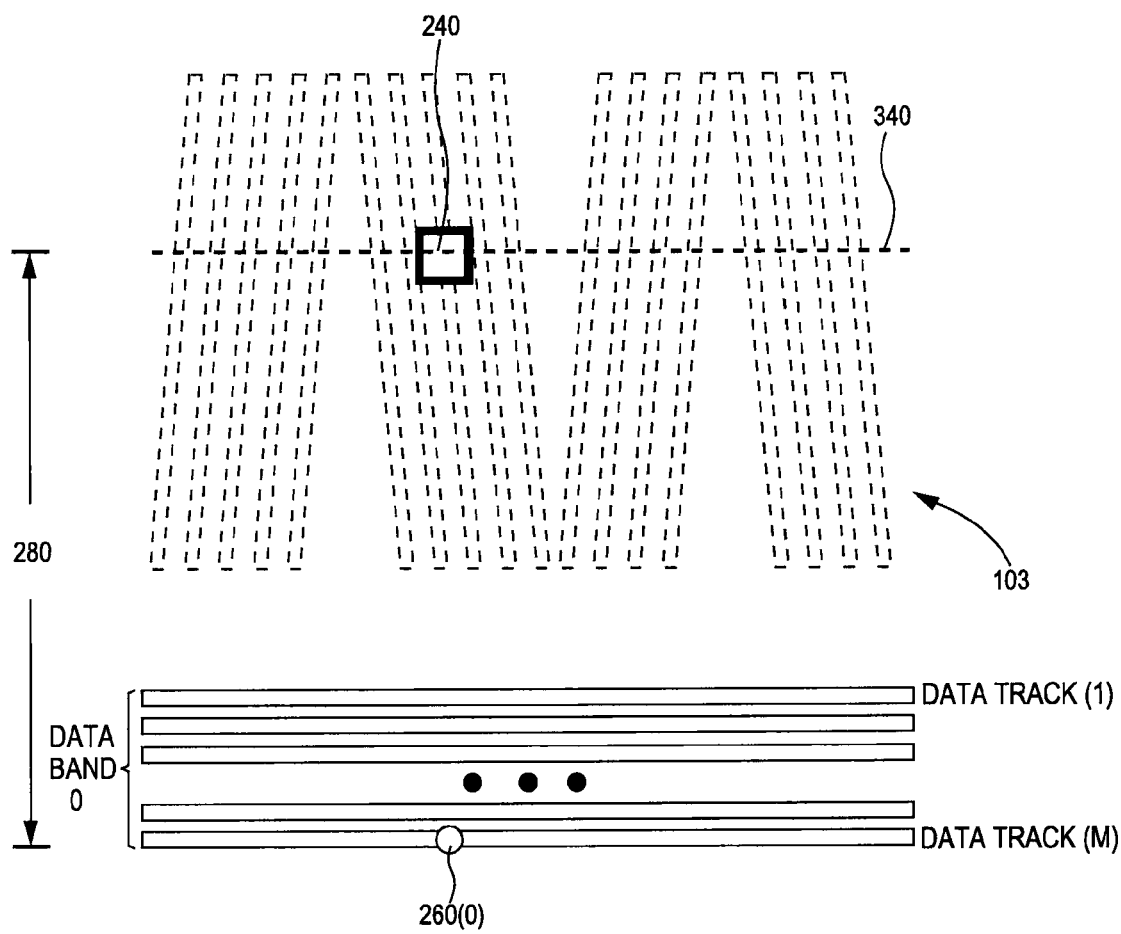
FIG. 4C illustrates the positioning a servo sensor with respect to a prior art servo pattern if reading information from, and/or writing information to, data tracks encoded in a second and opposing edge of one of Applicant's data bands.

Referring now to FIG. 4C, when a read head 260(0) is reading data encoded in an (M)th data track disposed in Data Band 0, servo sensor 240 would detect a portion of prior art servo band 103 adjacent servo sensor position 340. More generally, when a read head is laterally positioned such that an (i)th read/write head reads data encoded in a (M)th and last data track encoded in an (i)th Data Band, servo sensor 240 would detect a portion of prior art servo band 103 adjacent servo sensor position 340. Similarly, when a read head is laterally positioned such that an (i)th read/write head reads data encoded in a (M)th and last data track encoded in an (i)th Data Band servo sensor 250 would detect a portion of prior art servo band 107 adjacent servo sensor position 340.

Referring now to FIGS. 3 and 4D, prior art servo band 103 comprises width 310. [It seems to me that you need a statement here saying that " . . . if you increased the number of read heads from N to 2*N then . . . " the servo head 240 would only use 350—leaving 360 unused—thus we can add another reader and use area 360 for storing data]. Servo sensor 240 utilizes portion 350 of servo band 103 to provide timing signals when reading data from, or writing data to, the data bands encoded in Applicant's sequential storage medium 400. This being the case, portion 360 of prior art servo band 103 would not utilized by servo sensor 240 when reading data from, or writing data to, any of the data bands encoded in Applicant's sequential storage medium 400.

Similarly, servo sensor 250 would utilizes portion 380 of prior art servo band 107 to provide timing signals when reading data from, or writing data to, the data bands encoded in Applicant's sequential storage medium 400. This being the case, portion 380 of prior art servo band 107 would not be utilized by servo sensor 250 when reading data from, or writing data to, any of the data bands encoded in Applicant's sequential storage medium 400 [Note that in FIG. 4D, 380 is the portion of the servo Band 107 detected by servo sensor 250 and 370 is the unused portion of servo band 107].

Applicant's sequential storage medium 400 comprises servo bands 410 and 420, wherein each of those servo bands comprises a width 350, wherein width 350 equals about (0.5× prior art width 310). By reducing the width of servo bands 410 and 420, i.e. eliminating unused servo pattern portions 360 and 380, Applicant's sequential storage medium 400 comprises sufficient width to comprise an additional data band. Therefore, Applicant's sequential storage medium 400 comprises (2N+1) data bands compared to the (N) data bands disposed in prior art sequential storage medium 100.

The use of servo patterns comprising a reduced servo pattern width thereby allowing the encoding of an additional data band necessarily increases the data storage capacity of the sequential storage medium. If the width of the written track remains constant, then transitioning from (N) data tracks to (2N) data tracks, and using a read head comprising (2N) read elements doubles the rate that data can be read from the sequential data storage medium, but does not increase the storage capacity of the sequential storage medium. On the other hand, encoding (2N+1) data bands more than doubles the rate at which data can be read from the storage medium, and also increases the storage capacity of that sequential storage medium by about 3.1% (this percentage assumes 33 readers).

Figure 5A:
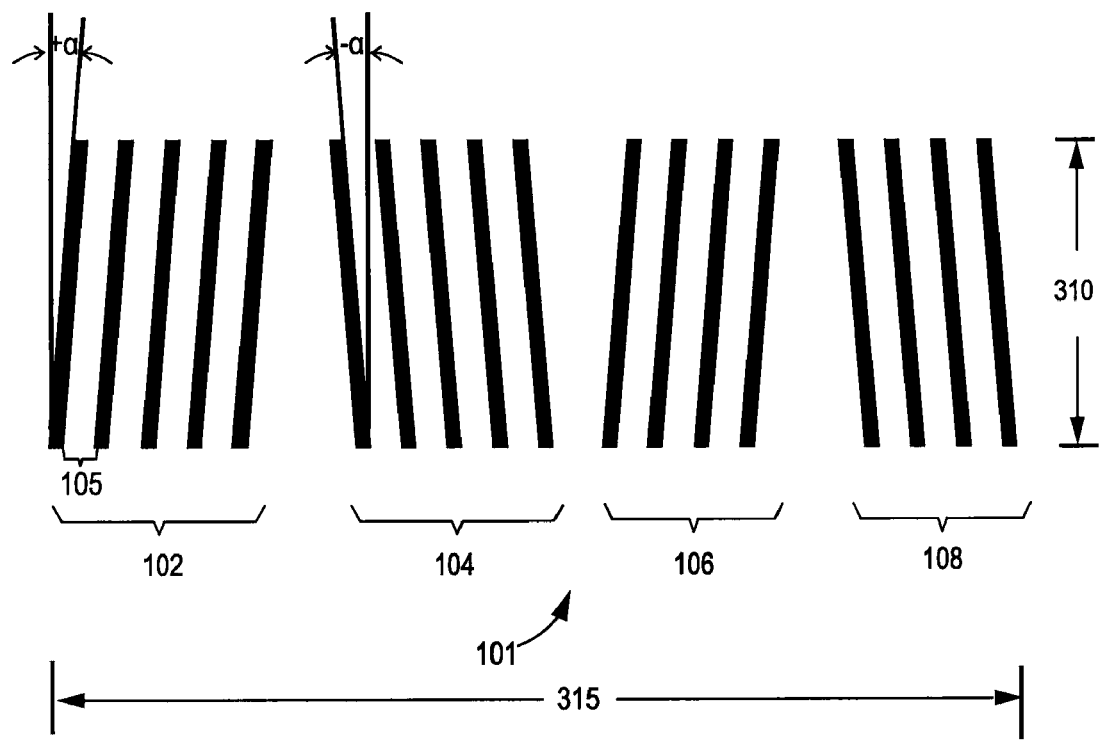
FIG. 5A illustrates one embodiment of Applicant's new servo pattern architecture.

Referring now to FIG. 5A, prior art servo pattern 101 comprises bursts 102, 104, 106, and 108, wherein servo pattern 101 comprises a height 310 and a width 315, and wherein the pulses comprising bursts 102 and 106 are offset at an angle +α with respect to transverse axis 190 (FIG. 1A), and wherein the pulses comprising bursts 104 and 108 are offset at an angle −α with respect to transverse axis 190, and wherein each of the pulses in bursts 102, 104, 106, and 108, are separated from adjacent pulses by a nominal spacing 105. Applicants' new servo pattern 430 comprises a length 410 and a width 350. In other respects, servo pattern 430 corresponds to servo pattern 101, such that the pulses comprising the first bursts and the third burst are offset at an angle +α with respect to transverse axis 190, and wherein the pulses comprising the second burst and the third burst are offset at an angle −α with respect to transverse axis, and wherein each of the pulses in the four bursts are separated from adjacent pulses by a nominal spacing 105.

In certain embodiments, length 410 is between about 157 microns and about 161 microns. In certain embodiments, length 410 is about 160 microns. [Note that length 315 is 200 microns—for comparison purposes].

As described hereinabove, the spacings of pulses disposed in bursts 102 and 104 are varied from the nominal spacing 105 to encode either a "1" or a "0". For example in the illustrated embodiment of FIG. 1A, the servo patterns comprising a portion of servo band 103 are shown to encode a value of 010101. In certain embodiments, a sequence of 36 servo patterns encodes an LPOS word, wherein 24 of the 36 servo patterns are used to encode a linear position along the length of the sequential tape medium. A controller, such as controller 220 (FIG. 2A), can determine the linear position of a read/write head, such as read/write head 210, along the length of a sequential information storage medium, such as sequential information storage medium 100, by decoding LPOS words as the storage medium is moved past the tape head.

Referring once again to FIG. 5A, prior art servo pattern 101 comprises a length 315. Using prior art servo pattern 101, an LPOS word comprises a Prior Art LPOS Word Length equal to at least the multiplication product of 36 and length 315. In certain embodiments, the Prior Art LPOS Word Length is about 7.2 mm.

Because Applicants' servo pattern 430 comprises a width 350, wherein width 350 is less than width 310 of prior art servo pattern 101, Applicant's servo pattern 430 comprises a length 410, wherein length 410 is less than prior art servo pattern length 315. As a result, an LPOS word encoded using Applicants' servo pattern 430 comprises a Shortened LPOS Word Length equal to the multiplication product of 36 and length 410, wherein Applicants' Shortened LPOS Word Length is less than the Prior Art LPOS Word Length. In certain embodiments, Applicant's Shortened LPOS Word Length is less than 7.2 mm [160 um*36=5.76 mm].

Because Applicants' Shortened LPOS Word Length is less than the Prior Art LPOS Word Length, a greater number of LPOS words can be encoded along a sequential information storage medium using Applicants' servo pattern 430. Encoding a greater number of LPOS words along the length of a sequential information storage medium results in greater linear positioning accuracy. Therefore, use of a servo band comprising a plurality of Applicants' servo pattern 430 rather than a plurality of prior art servo pattern 101 allows the encoding of a greater number of total data tracks on a sequential information storage medium, and also, facilitates improved linear positioning of a read/write head along the length of that sequential information storage medium.

Figure 5A:
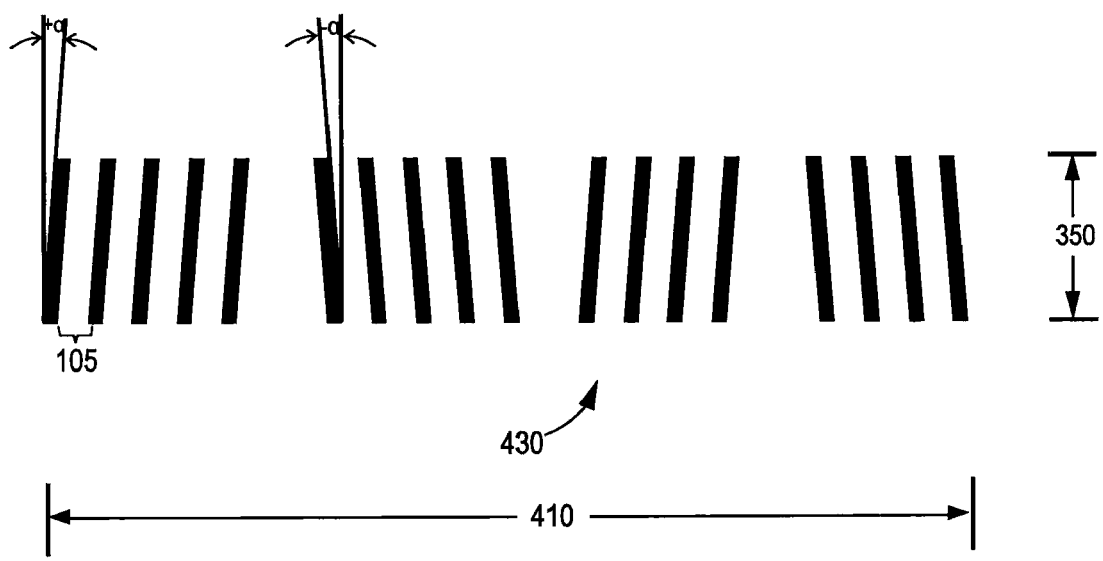
Figure 5B:
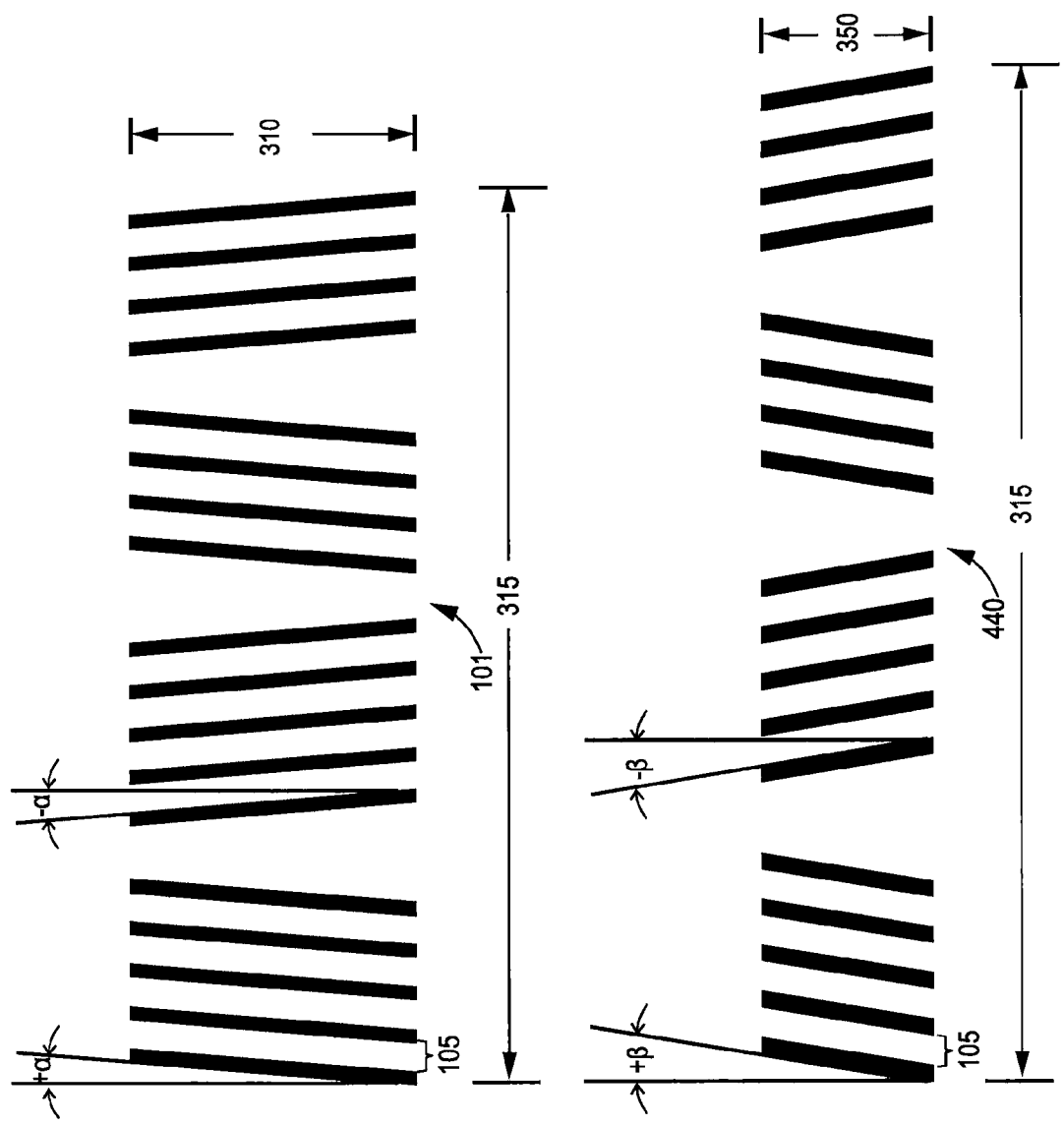
FIG. 5B illustrates a second embodiment of Applicant's new servo pattern architecture.

As discussed hereinabove, read/write head lateral position is derived from the relative timings of pulses generated by servo sensors which generate position error signals ("PES"). Referring now to FIG. 5B, Applicants' servo pattern 440 comprises reduced width 350 with respect to prior art width 310, but the same length 315 as does prior art servo pattern 101. Referring now to FIGS. 5A and 5B, the pulses used in both prior art servo pattern 101 and Applicants' servo pattern 430 utilize either a +α angle offset or a −α angle offset with respect to transverse axis 190 (FIG. 1A). In certain embodiments, angle α is about 6 degrees.

Applicants' servo pattern 440 comprises the same length 315 as does prior art servo pattern 101. In order to increase the length of servo pattern 440 with respect to Applicants' servo pattern 430 and still maintain the same nominal spacing 105 between adjacent pulses, the pulses disposed in Applicants' servo pattern 440 utilize either a +β angle offset or a −β angle offset with respect to transverse axis 190 (FIG. 1A), wherein the angle β is greater than the angle α. In certain embodiments, angle β is about 12 degrees.

Increasing the azmuthal slope of the pulses disposed in Applicant's servo pattern 440 from the azmuthal slope of the pulses disposed in prior art servo pattern 101, increases the accuracy of PES signals generated by detecting Applicant's servo pattern 440 one or more servo sensors. Therefore, use of a servo band comprising a plurality of Applicants' servo pattern 440 rather than a plurality of prior art servo pattern 101 allows the encoding of a greater number of total data tracks on a sequential information storage medium, and also, provides improved lateral positioning accuracy of a read/write head across the width of that sequential information storage medium.

Figure 6:
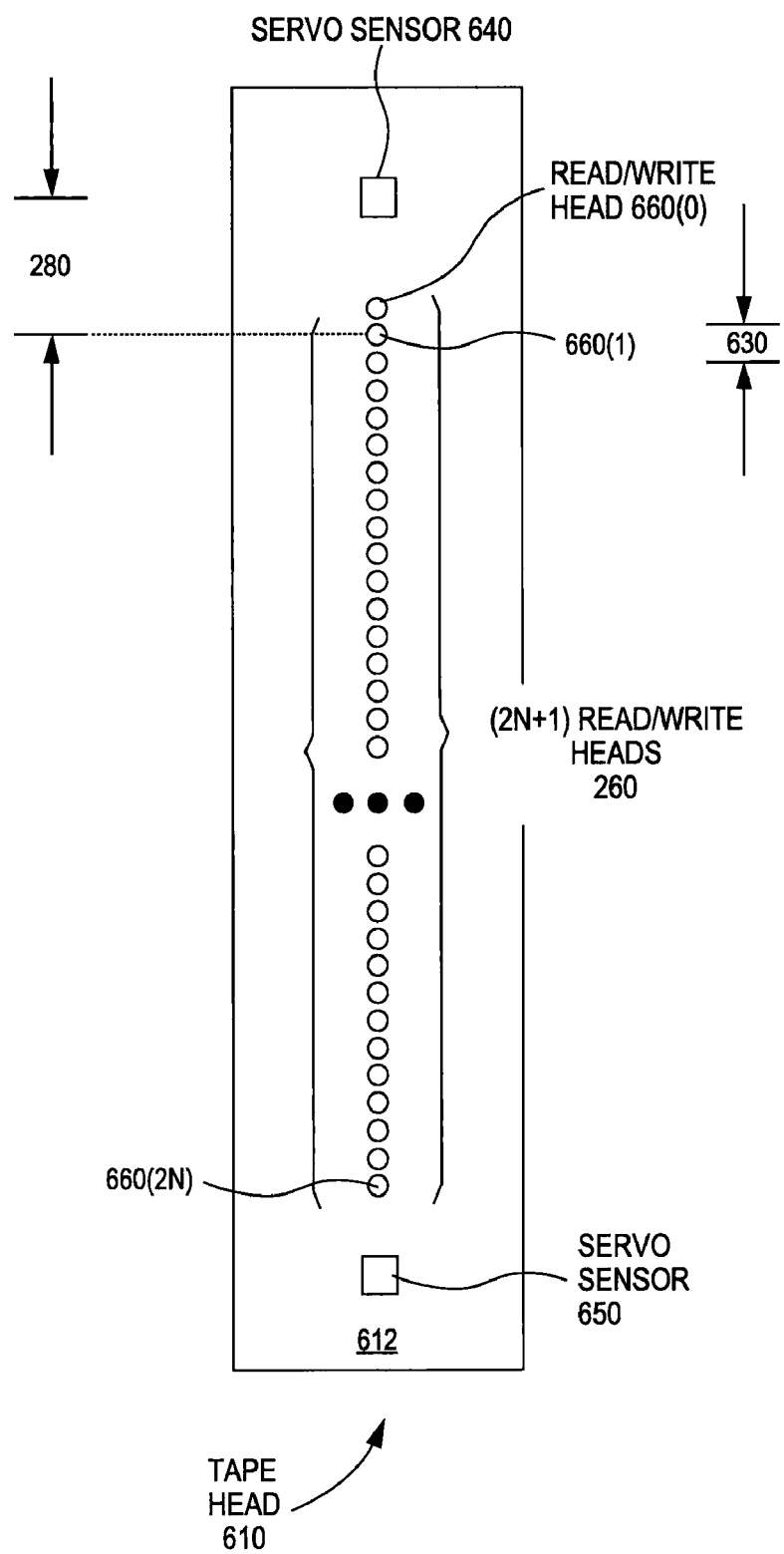
FIG. 6 illustrates Applicant's read/write head used to read information from, and/or write information to, Applicant's sequential information storage medium of FIG. 5A or 5B.

FIG. 6 illustrates Applicant's tape head 610. Referring now to FIGS. 2B and 5(A or B?), prior art read/write head 210 comprises servo sensor 240 disposed at one end, servo sensor 250 disposed at a second and opposing end, and (N) read/write heads disposed between servo sensor 240 and servo sensor 250. A distance 290 separates each read/write head from a next adjacent read/write head. A distance 280 separates a first read write/head, such as for example read/write head 260(0) from servo sensor 240, and distance 280 separates servo sensor 250 from the last read/write head, such as read/write head 260(N−1).

Tape head 610 comprises a servo sensor 640 disposed at one end, a servo sensor 650 disposed at a second and opposing end, and (2N+1) read/write heads disposed between servo sensor 640 and servo sensor 650. A distance 630 equal to distance 290 divided by two separates each read/write head from a next adjacent read/write head. A distance 280 separates a second read write/head, such as for example read/write head 660(1) from servo sensor 640, and distance 280 separates servo sensor 650 from the next to the last read/write head, such as read/write head 560(2N−1).

Applicants' tape head 610 comprises a "legacy" configuration comprising servo sensors 640 and 650 in combination with read/write heads 560(1), 560(3), 560(5), through 560(2N−1) such that tape head 610 can be used to write data to, and read data from, prior art sequential information storage media such as sequential information storage medium 100, wherein that prior art storage medium comprises (N) data bands. In addition, Applicants' tape head comprises a total of (2N+1) read/write heads and can be used to write data to, and read data from, Applicant's sequential information storage medium comprising (2N+1) data bands, such as sequential information storage medium 400 (FIG. 4A). In certain embodiments, (N) equals 16 and (2*N+1) equals 33. In certain embodiments, (N) equals 33 and (2*N+1) equals 67.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write data to sequential data storage media, comprising:
   supplying a data storage apparatus;
   supplying a first sequential data storage medium comprising (N) data bands and a storage medium width;
   using said data storage apparatus, simultaneously writing (N) data tracks to said first data storage medium;
   supplying a second sequential data storage medium comprising said storage medium width;
   using said data storage apparatus, simultaneously writing (2N+1) data tracks to said second data storage medium.

2. The method of claim 1, wherein (N) is 16.

3. The method of claim 1, wherein said data storage apparatus comprises (2N+1) write heads.

4. The method of claim 1, wherein said second sequential storage medium further comprises:
   a first end, a second end, a first side, an opposing second side, and a transverse axis orthogonal to said first side and said second side;
   a plurality of servo patterns encoded lengthwise between said first end and said second end and adjacent said first side;
   wherein each of said plurality of servo patterns comprises a width less than or equal to 103 microns.

5. The method of claim 4, wherein each servo pattern comprises a plurality of bursts, and wherein each plurality of bursts comprises a plurality of stripes, and wherein each stripe is written to said second sequential information storage medium at an offset angle with respect to said transverse axis, wherein said offset angle is greater than 6 degrees.

6. A method to read data from sequential data storage media, comprising:
   supplying a data storage apparatus;
   supplying a first sequential data storage medium comprising (N) data bands;
   using said data storage apparatus, simultaneously reading from said first data storage medium a data track disposed in each of said (N) data bands;
   supplying a second sequential data storage medium comprising (2N+1) data bands;
   using said data storage apparatus, simultaneously reading from said second data storage medium a data track disposed in each of said (2N+1) data bands.

7. The method of claim 6, wherein (N) is 16.

8. The method of claim 6, wherein said data storage apparatus comprises (2N+1) read heads.

9. The method of claim 6, wherein said second sequential storage medium further comprises:
   a first end, a second end, a first side, an opposing second side, and a transverse axis orthogonal to said first side and said second side;
   a plurality of servo patterns encoded lengthwise between said first end and said second end and adjacent said first side;
   wherein each of said plurality of servo patterns comprises a width less than or equal to 103 microns.

10. The method of claim 9, wherein each servo pattern comprises a plurality of bursts, and wherein each plurality of bursts comprises a plurality of stripes, and wherein each stripe is written to said second sequential information storage medium at an offset angle with respect to said transverse axis, wherein said offset angle is greater than 6 degrees.

11. A data storage drive comprising a write head and a computer readable medium comprising computer readable program code disposed therein to write data to sequential data storage media, the computer readable program code comprising a series of computer readable program steps to effect:
- writing (N) data tracks to a first sequential data storage medium comprising a storage medium width;
- writing (2N+1) data tracks to a second sequential data storage medium comprising said storage medium width.

12. The method of claim 11, wherein (N) is 16.

13. The method of claim 11, wherein said data storage apparatus comprises (2N+1) write heads.

14. The method of claim 11, wherein said second sequential storage medium further comprises:
- a first end, a second end, a first side, an opposing second side, and a transverse axis orthogonal to said first side and said second side;
- a plurality of servo patterns encoded lengthwise between said first end and said second end and adjacent said first side;
- wherein each of said plurality of servo patterns comprises a width less than or equal to 103 microns.

15. The method of claim 14, wherein each servo pattern comprises a plurality of bursts, and wherein each plurality of bursts comprises a plurality of stripes, and wherein each stripe is written to said second sequential information storage medium at an offset angle with respect to said transverse axis, wherein said offset angle is greater than 6 degrees.

16. A data storage apparatus comprising a read head and a computer readable medium comprising computer readable program code disposed therein to write data to sequential data storage media, the computer readable program code comprising a series of computer readable program steps to effect:
- mounting a first sequential data storage medium comprising (N) data bands;
- simultaneously reading from said first data storage medium a data track disposed in each of said (N) data bands;
- dismounting said first sequential data storage medium;
- mounting a second sequential data storage medium comprising (2N+1) data bands;
- simultaneously reading from said second data storage medium a data track disposed in each of said (2N+1) data bands.

17. The data storage apparatus of claim 16, wherein (N) is 16.

18. The data storage apparatus of claim 16, wherein said data storage drive comprises (2N+1) read heads.

19. The data storage apparatus of claim 16, wherein said second sequential storage medium further comprises:
- a first end, a second end, a first side, an opposing second side, and a transverse axis orthogonal to said first side and said second side;
- a plurality of servo patterns encoded lengthwise between said first end and said second end and adjacent said first side;
- wherein each of said plurality of servo patterns comprises a width less than or equal to 103 microns.

20. The data storage apparatus of claim 19, wherein each servo pattern comprises a plurality of bursts, and wherein each plurality of bursts comprises a plurality of stripes, and wherein each stripe is written to said second sequential information storage medium at an offset angle with respect to said transverse axis, wherein said offset angle is greater than 6 degrees.

* * * * *